(12) United States Patent
Capodieci

(10) Patent No.: US 8,268,374 B2
(45) Date of Patent: Sep. 18, 2012

(54) PET FOOD AND PROCESS OF MANUFACTURE

(75) Inventor: Roberto Capodieci, Glen Ellyn, IL (US)

(73) Assignee: Creative Resonance, Inc., Glen Ellyn, IL (US)

( * ) Notice: Subject to any disclaimer, the term of this patent is extended or adjusted under 35 U.S.C. 154(b) by 426 days.

(21) Appl. No.: 12/193,574

(22) Filed: Aug. 18, 2008

(65) Prior Publication Data

US 2010/0040745 A1  Feb. 18, 2010

(51) Int. Cl.
*A23P 1/02* (2006.01)
(52) U.S. Cl. ......... 426/245; 426/512; 426/623; 426/805
(58) Field of Classification Search .................. 426/238, 426/503, 506, 512, 805, 89, 245, 453–455, 426/237, 623; 425/174.2; 111/238, 503, 111/506, 512, 805, 89; 119/709–711; 99/451, 99/DIG. 12
See application file for complete search history.

(56) References Cited

U.S. PATENT DOCUMENTS

| | | | |
|---|---|---|---|
| 2,961,773 A | 11/1960 | Honn | |
| 3,175,746 A | 3/1965 | Leonard et al. | |
| D282,431 S | 2/1986 | Stricker | |
| D290,570 S | 6/1987 | Virk | |
| D358,969 S | 6/1995 | Romanoff | |
| 5,846,584 A | 12/1998 | Capodieci | |
| 5,861,185 A | 1/1999 | Capodieci | |
| 5,871,783 A | 2/1999 | Capodieci | |
| 5,914,140 A * | 6/1999 | Kamper et al. | 426/89 |
| 5,928,695 A | 7/1999 | Capodieci | |
| 6,120,827 A | 9/2000 | Rocca | |
| 6,123,972 A | 9/2000 | Matthews et al. | |
| 6,143,336 A | 11/2000 | Capodieci | |
| 6,210,728 B1 | 4/2001 | Capodieci | |
| 6,231,330 B1 | 5/2001 | Capodieci | |
| 6,318,248 B1 | 11/2001 | Capodieci | |
| 6,368,647 B1 | 4/2002 | Capodieci | |
| 6,403,132 B1 | 6/2002 | Capodieci | |
| 6,431,849 B1 | 8/2002 | Capodieci | |
| 6,517,879 B2 | 2/2003 | Capodieci | |
| 6,530,767 B1 | 3/2003 | Capodieci | |
| 6,530,768 B1 | 3/2003 | Harrop | |
| 6,601,491 B1 | 8/2003 | Jensen | |
| 6,607,765 B2 | 8/2003 | Capodieci | |
| 6,635,292 B2 | 10/2003 | Capodieci | |
| 6,655,948 B2 | 12/2003 | Capodieci | |
| 6,783,784 B2 | 8/2004 | Skene et al. | |
| 7,141,259 B2 | 11/2006 | Capodieci | |
| 2004/0052906 A1 | 3/2004 | Hernandez et al. | |
| 2006/0251793 A1 * | 11/2006 | Junger | 426/623 |

FOREIGN PATENT DOCUMENTS

| | | |
|---|---|---|
| JP | 08-298974 A | 11/1996 |
| KR | 10-0478007 B1 | 3/2005 |
| KR | 10-0733906 B1 | 7/2007 |
| KR | 10-2008-0053773 A | 6/2008 |

* cited by examiner

*Primary Examiner* — Steven Leff
(74) *Attorney, Agent, or Firm* — Pauley Petersen & Erickson

(57) ABSTRACT

A method for manufacturing pet food with an ultrasonic horn and an anvil, using human grade ingredients without the use of additives, including but not limited to preservatives, plasticizers, binders and fluidizers.

20 Claims, 10 Drawing Sheets

PET FOOD AND PROCESS OF MANUFACTURE

BACKGROUND OF THE INVENTION

1. Field of the Invention

This invention relates generally to a method for manufacturing pet food. Specifically, this invention relates to a method of manufacturing pet food with an ultrasonic horn and an anvil and without the use of undesirable components such as plasticizers, dyes, chemicals or artificial preservatives.

2. Discussion of Related Art

Mirroring the obesity epidemic of their owners, pet obesity has become a real danger especially for those animals living in urban sedentary environments. Accordingly, pet owners are seeking to provide their pets a healthy and nutritious diet that is low in fat and low in calories. Additionally, according to current trends, many owners are seeking products which include high-quality, human grade ingredients, often organic, to provide their pets with all the natural elements that are necessary for a balanced diet, such as: protein, vitamins, minerals, fiber, antioxidants, amino acids, carbohydrates and omega 3 fatty acids. Further, owners desire ingredients which are ideally free of artificial preservatives and coloring. And, if such ingredients must be processed, the processing should be kept to a minimum to prevent the loss of the nutritional value.

Currently, there are three basic manufacturing processes widely used by the pet food industry, namely, extrusion, oven baked (biscuit process) and injection molding.

The extrusion process is primarily utilized for the production of dry pet food pellets, or kibble. During such process a mixture of raw materials is subjected to a rapid injection of steam, less than 3 minutes, and subsequently extruded under high pressure through a metal die. As the product reaches atmospheric pressure after leaving the extrusion die, the pellets expand in volume into crunchy, aerated products. The resultant kibble is allowed to dry, sprayed with oils, vitamins, fats and any other desirable ingredients that are heat-sensitive. This process has short-comings. First, the integrity and shelf life of extruded kibble is very vulnerable to inadequate packaging and storage conditions, since the fats and oils added after the extrusion on the product surface can easily become rancid if exposed to air for extended periods of time. For this reason, the process frequently involves the use of preservatives such as BHT and Ethoxyquin. Many pet owners seek to avoid these chemicals because they may cause disease and other medical concerns. Secondly, the product obtained by this process tends to be less digestible.

The oven baked or biscuit process entails a forming process, typically accomplished through forming rolls, in which a plastic dough mass is converted into individually shaped products which are subsequently oven baked in a slower, gentler heating action. The resulting products, regardless of their shape and size, are considered by pet owners more natural a more digestible. It is claimed that such slow process acts as a "pre-digest" of the kibble causing less strain on the animal digestive system and allows greater food absorption. Also, since fat, oils and vitamins are "baked in" rather than added on the product surface through spraying, they are less prone to deterioration and oxidation, consequently baked kibble enjoys a slightly longer shelf life when compared to their extruded relative. However, this process takes longer to produce than other current methods.

Lastly, Injection molding is the process of choice when complex full tri-dimensional shapes and significant hardness are attributes that are sought in the finished products. This process is similar to molding of thermoplastic parts, it requires a complex monumental type of equipment which must be contained in a properly conditioned ambient environment to prevent condensation from forming on the dies. Typically, for a multi-cavity die (6-8 cavities) the cycle time is around 1 minute and 45 seconds, so relatively slow. The product itself needs to be de-flashed and dried before packaging, while the resulting "spider" must be ground to be recycled. More importantly, the product formula allows for ingredients only in a fine particulate or powder forms, cannot contemplate any kind of significant inclusion. And, most critically, injection molding must include plasticizers, humectants, binders and fluidizers (cellulose, starches, glycerin, gelatin, propylene glycol, etc.) to facilitate the injection process. The resulting product, while visual pleasing in its tridimensional form, doesn't reveal the contribution of the individual raw materials (it's fully homogenized in color and texture) and it is seriously compromised in its nutritional profile due the additions of those ingredients functional only to the injection process.

Additionally, all three processes limit the addition of natural fibers. Therefore, it is unusual to find products made by any of these processes that have a fiber content greater than 6%.

In view of the above, a need exists for: A process that can use natural human-grade ingredients from the five groups of the food pyramid. A process of manufacture that is capable of delivering products whose nutritional profile is uncompromised by the addition of undesirable components, including fillers, plasticizers fluidizers, dyes, chemicals, artificial preservatives. A process that delivers a product where each ingredient is visible which contributes to the product's ultimate and unique appearance. A process that reduces or eliminates the use of ingredients which are known to produce allergic reactions in pets, including but not limited to wheat, glutens, brewer's yeast. A process that doesn't require the use of binders, including cellulose, gum, gelatin resulting in easily digestible products that will not swell, are highly soluble and will not cause intestinal occlusions in pets. A process which provides a product where the abrasiveness and natural roughness of the agglomerated ingredients results in a teeth cleaning action during the chewing process. A process that is highly versatile so as to produce items of complex shapes and textures beyond what is currently possible. A process that is highly flexible with respect to the nutritional profiles achievable, to include also dietetic ones delivering: High protein, Low Fat, High fiber (>15%) and Low overall calorie contents. A process that creates a product with a high fiber content which helps with the bowel movement and the cleansing of the intestinal tract. A process that eliminates the need for large assets such as ovens, cooker/extruders and injection molding machines as well the need for many peripheral systems.

SUMMARY OF THE INVENTION

A general object of the invention is to provide an improved method of manufacturing pet food. A more specific objective of the invention is to provide a method of manufacturing pet food that uses high-quality, human grade ingredients without the use of undesirable ingredients including fillers, plasticizers, fluidizers, dyes, chemicals and artificial preservatives.

The general object of the invention can be attained, at least in part, by the following process. Firstly, high quality human grade ingredients from the following food groups are mixed: vegetable, fruit, milk and meat. Next, these ingredients are combined with atomized water to a desired moisture level and to a homogeneous blend. Then, the combined ingredients are placed into a forming chamber and compressed between an anvil plug and an ultrasonic horn by means of an actuator.

Finally, the ultrasonic horn is energized to cause the combined ingredients to be agglomerated into a desired shape.

The prior art generally fails to produce a pet food that utilizes human grade ingredients without needing additives such as preservatives, plasticizers and binders. Nor does the prior art produce a pet food according to the described method.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

The method for manufacturing pet food according to this invention will best be understood by first introducing the apparatus.

Figure 1:
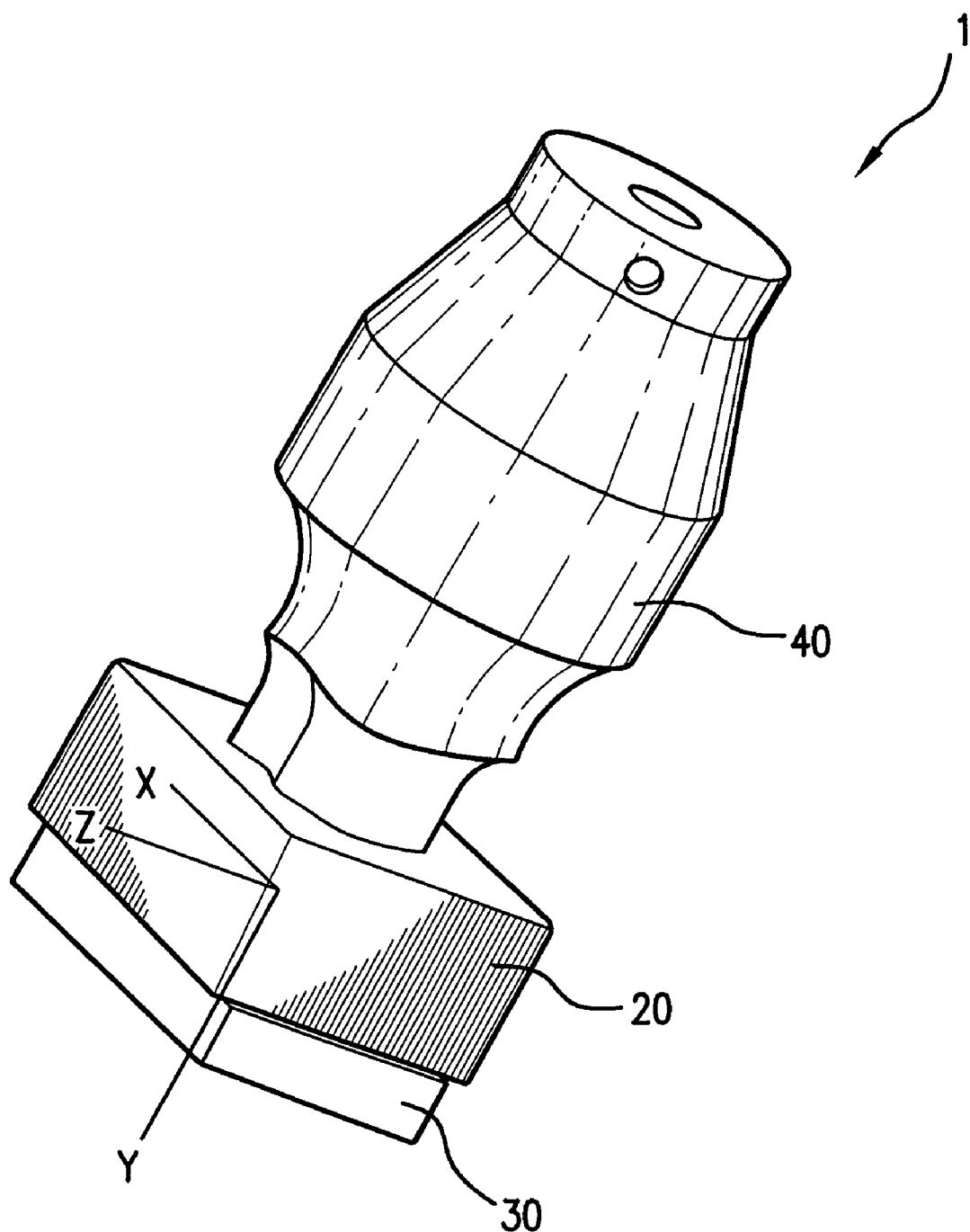
FIG. 1 is a perspective view of an apparatus for manufacturing pet food according to one embodiment of this invention.

FIG. 1 shows a perspective view of an apparatus 10 for the manufacture of pet food The apparatus 10 includes a sleeve 20, an anvil 30, and an ultrasonic horn 40. The ultrasonic horn 40 is preferably a part of an ultrasonic stack that includes a converter (not shown) through a booster (not shown). The ultrasonic stack receives energy from an ultrasonic power supply (not shown) by means of a radio frequency cable (not shown).

Figure 2:
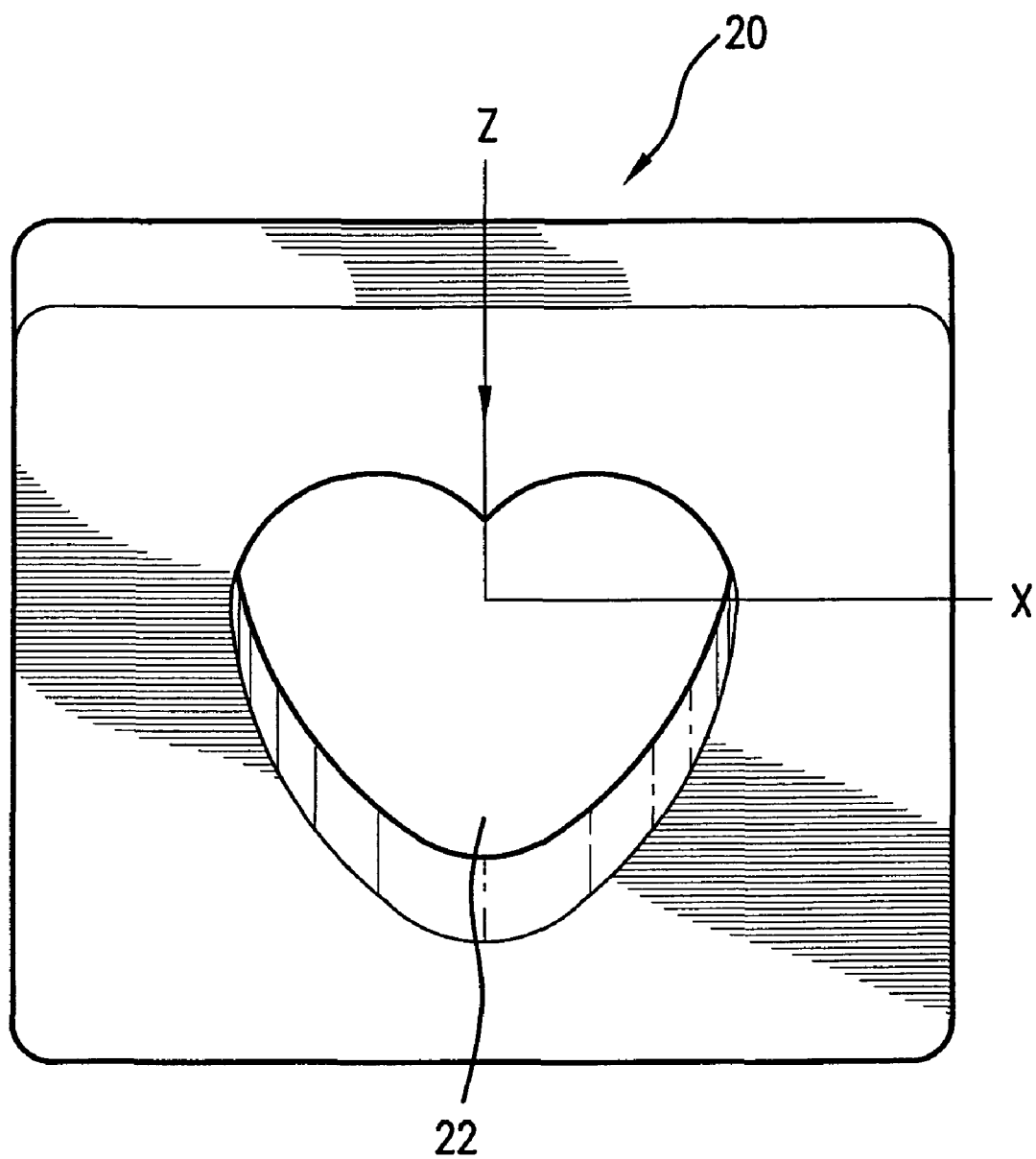
FIG. 2 is a perspective view of a sleeve according to an embodiment of this invention.

FIG. 2 shows a perspective view of the sleeve 20 shown in FIG. 1. The sleeve 20 includes a forming chamber 22. The forming chamber 22 in this embodiment is heart-shaped. However, the present invention can use a forming chamber 22 of any shape including but not limited to bone-shaped, animal-shaped, letter-shaped and logo-shaped. In the set-up of FIG. 1, the sleeve 20 is removable, after the process cycle is complete, to allow access and discharge of a finished product.

Figure 3:
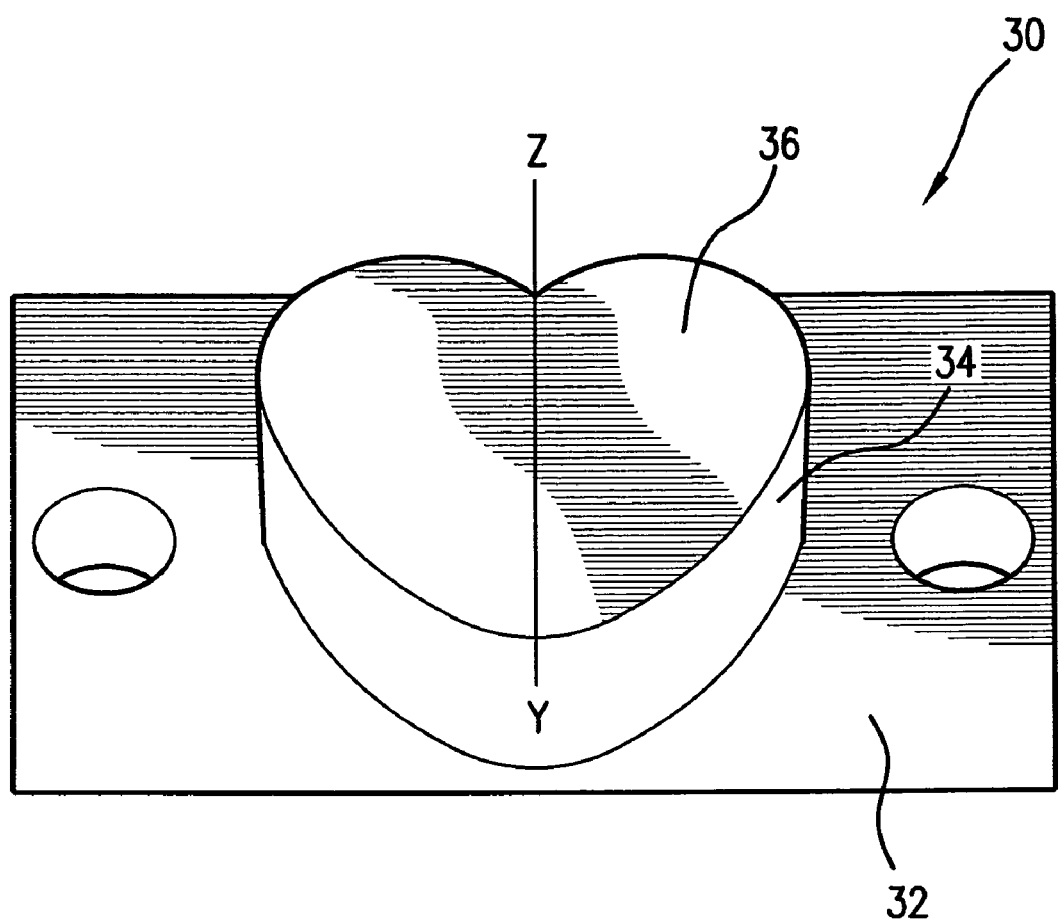
FIG. 3 is a perspective view of an anvil according to an embodiment of this invention.
Figure 3A:
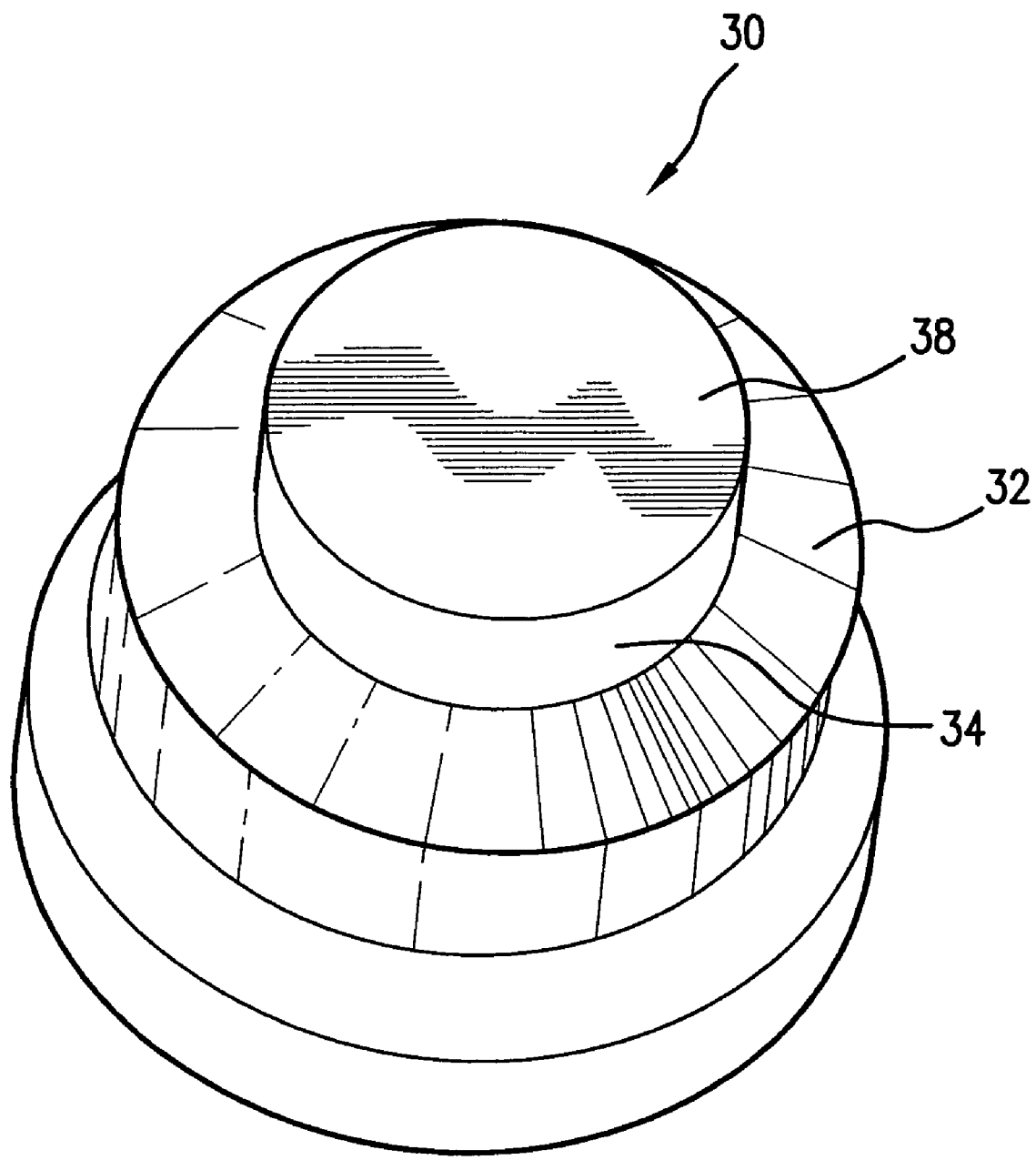
FIG. 3A is a perspective view of an anvil according to an another embodiment of this invention.

FIG. 3 shows a perspective view of the anvil 30 shown in FIG. 1. The anvil 30 includes an anvil base 32, an anvil plug 34 and a forming cavity 36. The anvil plug 34 can be stationary in one embodiment. In another embodiment, the anvil plug 34 can be directly moveable or indirectly by actuating the anvil 30 (both by means not shown here) to penetrate the forming chamber 22 of the sleeve 20 to exert the desired compressive force on a product mix. In this embodiment, the forming surface 36 is concave and heart-shaped. However, the present invention can use a forming surface 36 of any type: flat, convex, concave, so as to impart shapes including but not limited to bone-shaped, animal-shaped, letter-shaped and logo-shaped. Shown in FIG. 3A, is an anvil plug 34 having a flat forming surface 38. The forming surface may also include surface details such as to deliver a product with mirror-like details, indented or embossed, including, but not limited to, lettering and logos.

According to one preferred embodiment of this invention, the anvil plug 34 may comprise an acoustic tool to provide energy to the charge. In such a manner the anvil plug 34 may cooperate with the ultrasonic horn 40 to inject energy to the charge of ingredients, in a simultaneous or sequential manner. In addition, one or both of the anvil plug 34 and/or the ultrasonic horn 40 may be heated to assist in creating a product having a cooked appearance. According to one preferred embodiment of this invention, the anvil plug 34 may be heated to a temperature of approximately 70 degrees F. as the anvil plug 34 is engaged with the ultrasonic horn 40.

Figure 4:
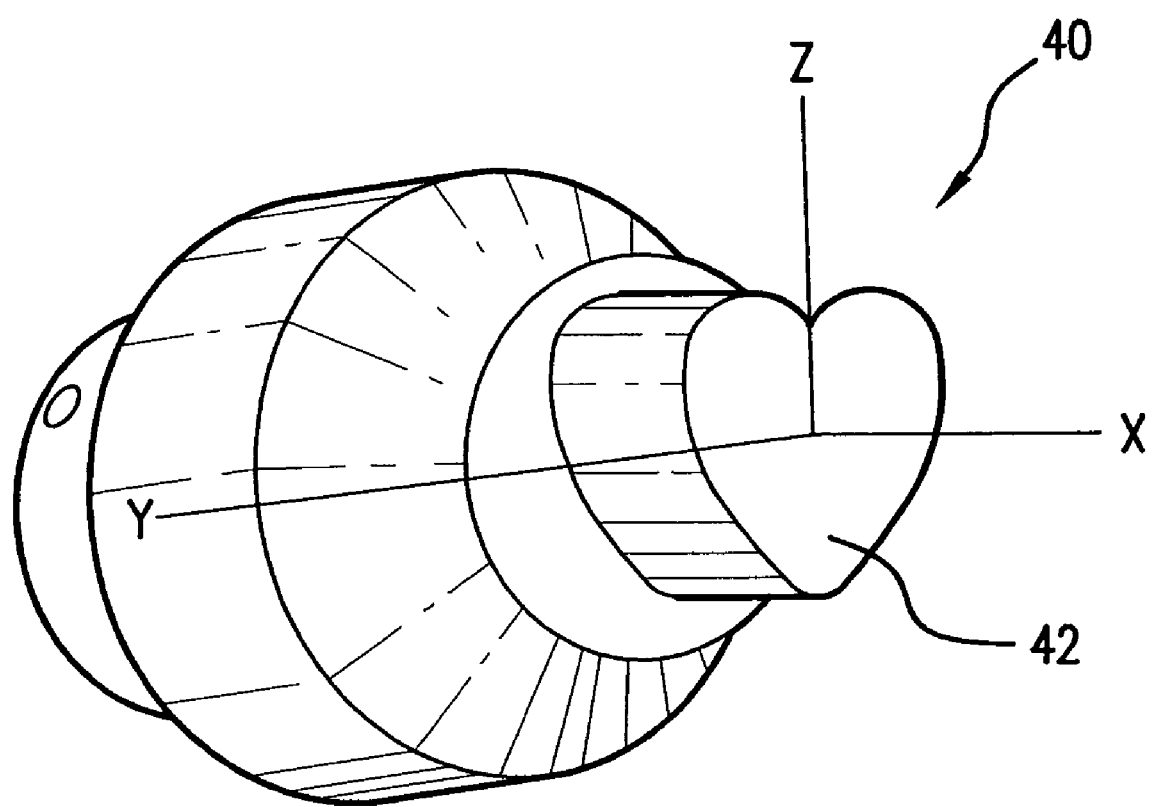
FIG. 4 is a perspective view of an ultrasonic horn according to an embodiment of this invention.

FIG. 4 shows a perspective view of the ultrasonic horn 40 shown in FIG. 1. The ultrasonic horn 40 includes a concave forming surface 42. In this embodiment, the resulting molding cavity 42 is heart-shaped. However, the present invention can use a forming surface 36 capable of imparting, in conjunction with the corresponding surface on the anvil plug 34, any shape to the finished product including, but not limited to, bone-shaped, animal-shaped, letter-shaped and logo-shaped.

Additionally, either one or both of the forming surfaces on the anvil plug 34 and the ultrasonic horn 40 can be provided with surface details suitable to create mirror like details such as logos and lettering on the finished product surface.

Figure 5:
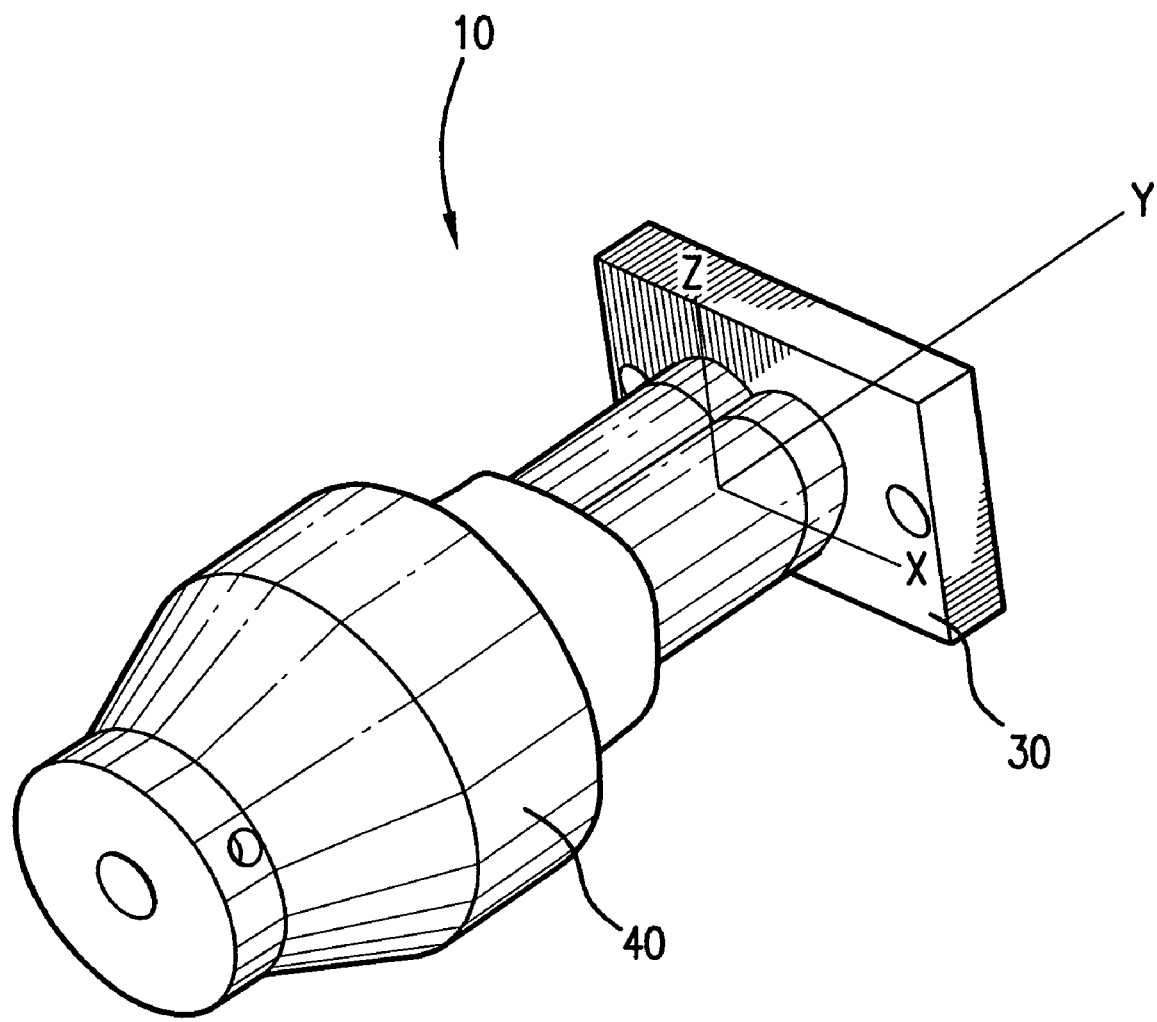
FIG. 5 is a perspective view of an apparatus for manufacturing pet food according to an embodiment of this invention.

FIG. 5 shows a perspective view of the ultrasonic horn 40 and the anvil 30 in their respective positions at the end of the forming process with the sleeve 20 removed.

The method for manufacturing pet food according to this invention may first include a mixing process, in either form, batch or continuous, fed by metering system, manual or automatic, that will deliver a formula's ingredients in the proper quantities and in a suitable sequence. Chosen dry ingredients may come in a variety of particulate forms and sizes, including but not limited to: flakes, granules, powders, kernels, diced, grated, ground and chopped.

The ingredients are then mixed with water, such as atomized water, and/or a suitable flavored suspension or solution, such as chicken broth or meat broth. The water or other fluid preferably coats the surface of the various particulates in order to bring the mix to the desired moisture level. Typically the mix receives an addition of moisture of 2 to 25%, preferably 2 to 15%, ideally 2 to 7% by weight, and is brought to a homogeneous blend. The mix is then transferred, by conventional means, into a feed hopper and will be dosed into a charge and deposited into the forming chamber 22 of the sleeve 20.

In an alternative embodiment, rather than adding atomized water, the mix is moistened through the use, in congruent percentages, of wet pomaces and/or pulps from ingredients belonging to the vegetables and fruits groups.

The charge in the forming chamber 22 is then compressed between the anvil plug 32 and the ultrasonic horn 40 by means of an actuator to a pressure rate typically of 10 to 200 kg/cm$^2$, preferably between 5 to 50 kg/cm$^2$, depending on the desired texture and hardness of the finished product. Note, that such pressure values are immensely lower than those typically needed in pressure forming and injection molding systems which can easily exceed 5,000 kg/cm$^2$. This allows for a more nimble, streamlined and less monumental process equipment and machinery.

Finally, the ultrasonic horn 40 is typically energized for a dwell time between 100 milliseconds to 10 seconds, preferably between 100 msec to 2 sec at a frequency of about 15 to 40 kHz, at an amplitude of 10 to 100 μm, preferably 15 to 75 μm. This level of energy is sufficient to cause the moistened mixture to become agglomerated into the desired final shape.

This combination of compressive force and total energy injection, will determine the ultimate texture and hardness of the finished product. Also note that while the compressive force, amplitude and dwell time will establish the total energy injected into the product. The actuator speed will determine the rate at which the energy will be injected. Such energy is delivered directly into the product molecules as they are being vibrated at the resonant frequency. This vibration, acting on the moisture uniformly distributed throughout the product charge, transforms the moisture into steam which in turn causes the proteins of the mix to coagulate setting the particulates into a unified product.

During testing, the specific energy covered a range between 30 and 300 joules per gram (J/g). The upper values of this range are necessary to achieve full caramelization and/or Maillard reaction in the finished product. However, the process can easily reach and exceed a specific energy of 1000 Joules/g if needed.

Figure 6:
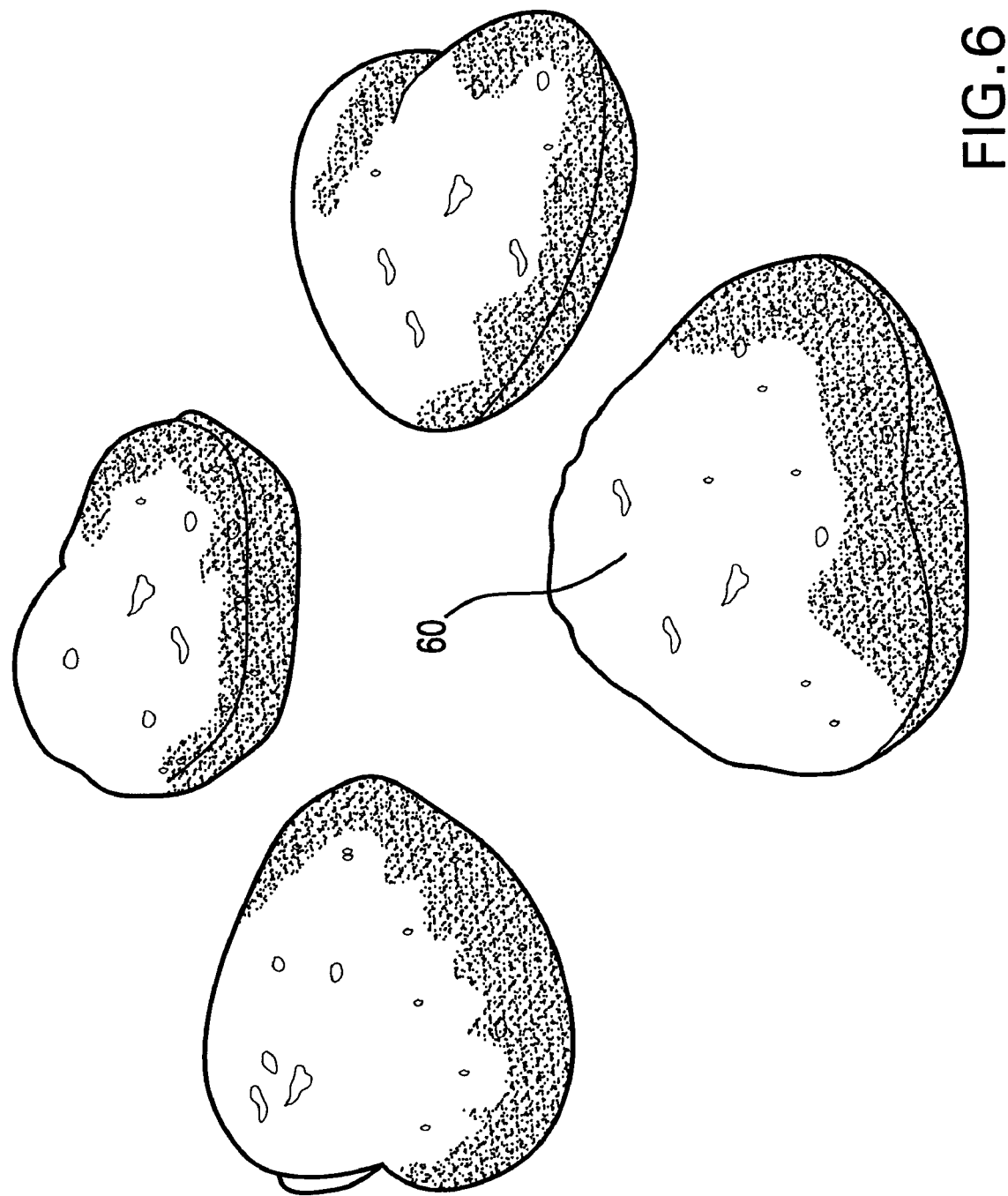
FIG. 6 is a photograph of a finished product according to one embodiment.
Figure 7:
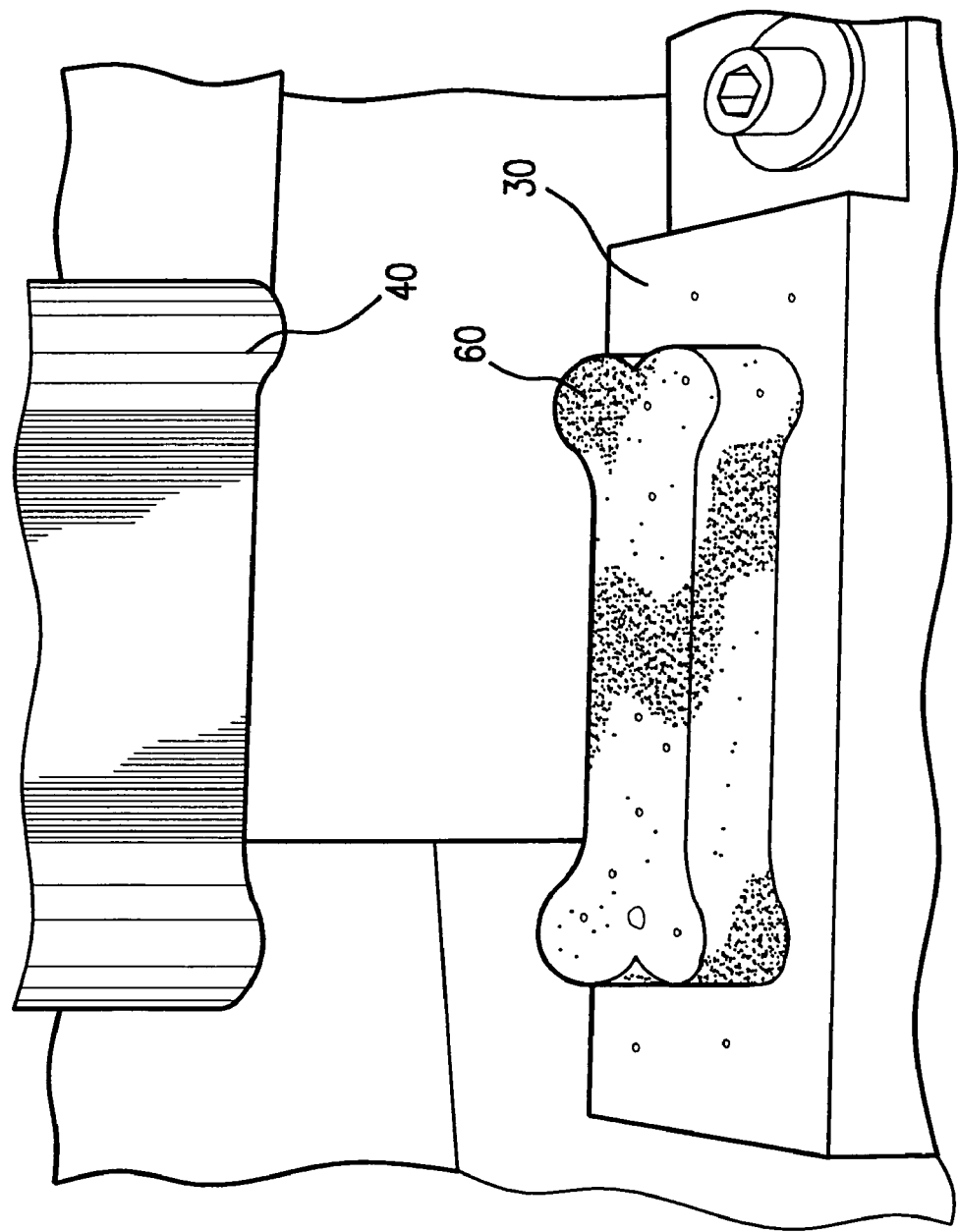
FIG. 7 is a photograph of a finished product according to another embodiment.
Figure 8:
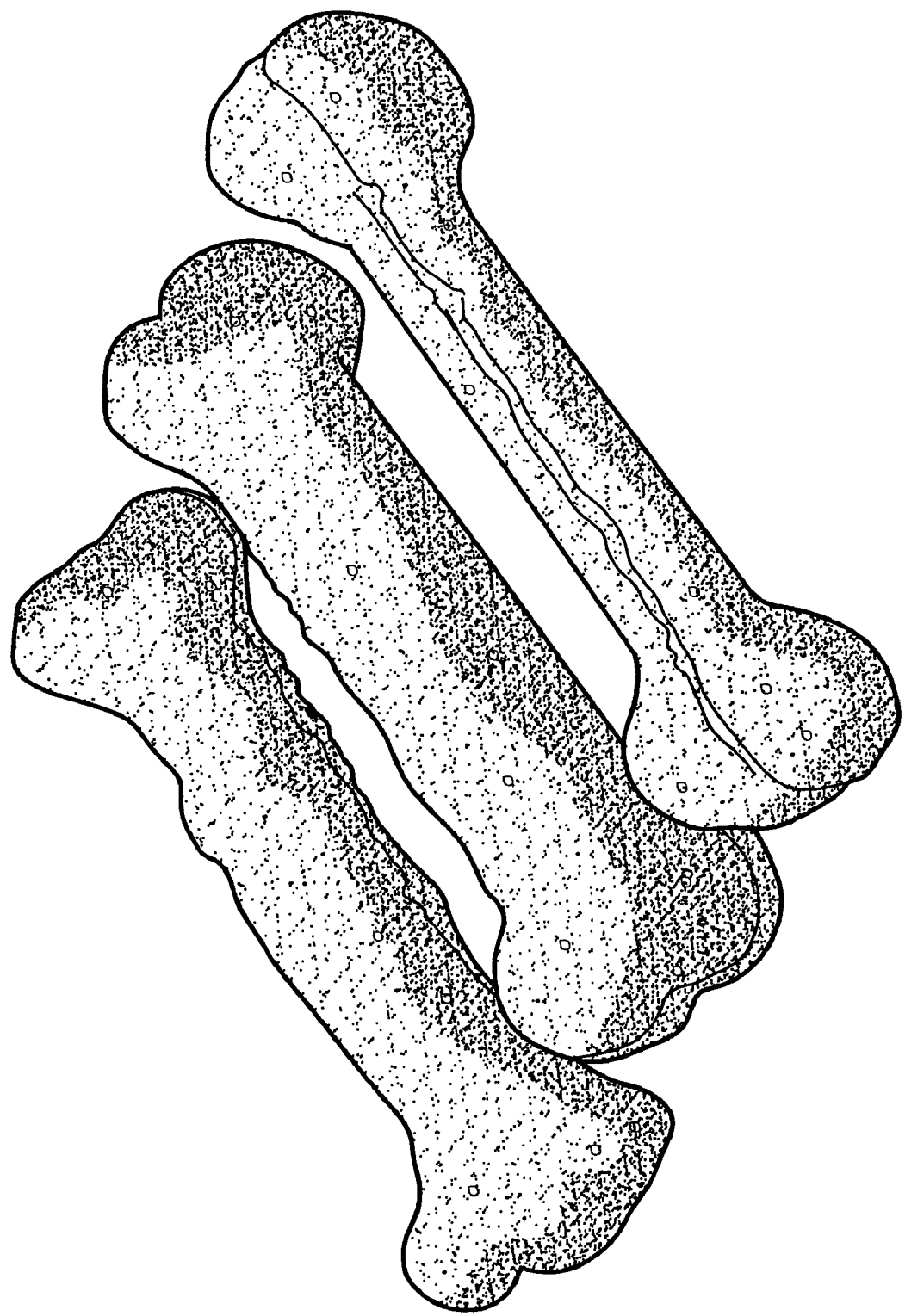
FIG. 8 is a photograph of a finished product according to the embodiment of FIG. 7.
Figure 9:
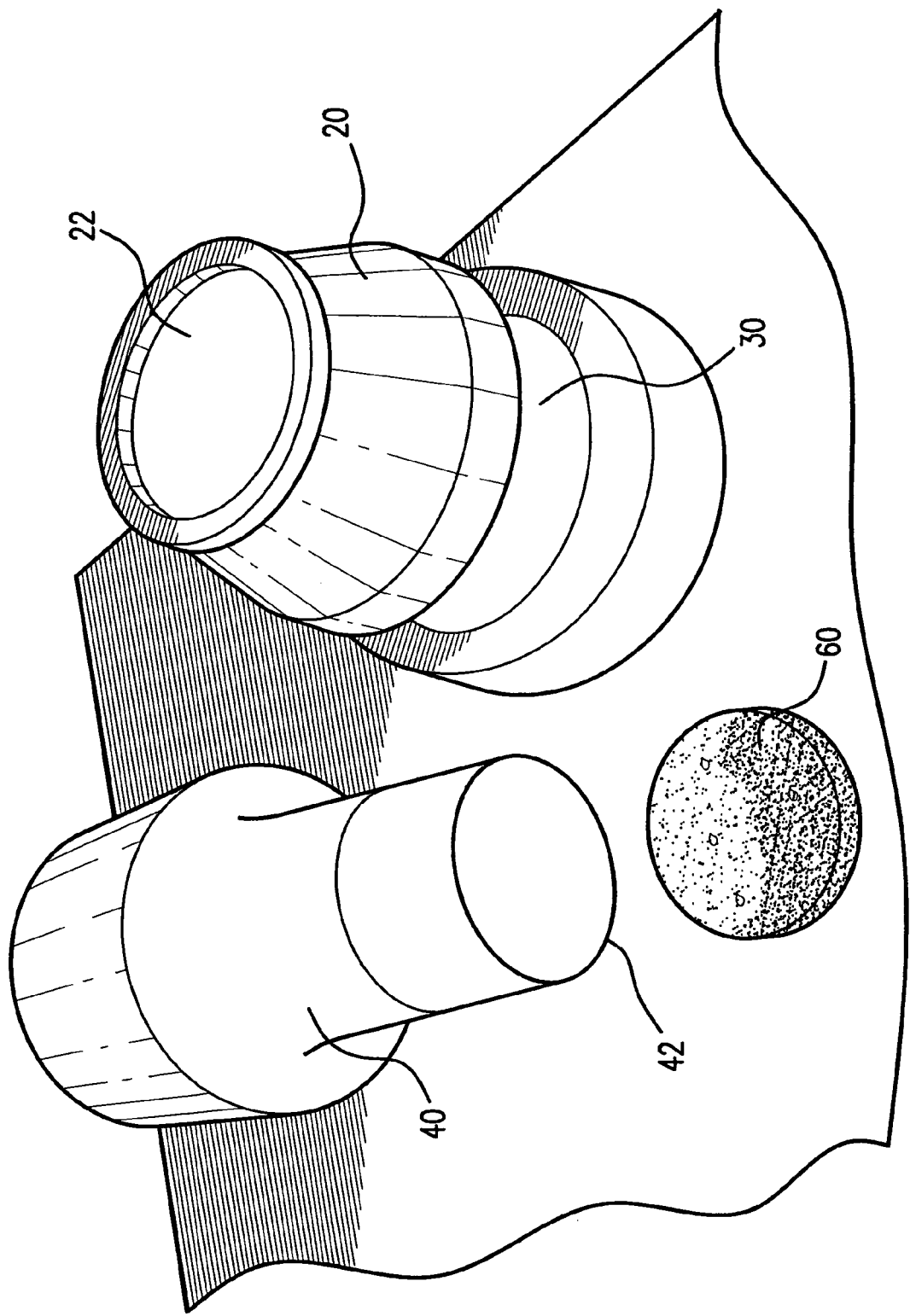
FIG. 9 is a photograph of a finished product according to another embodiment.

FIG. 6 shows a photograph of a finished product 60 in a heart-shaped form according to one preferred embodiment of this invention. FIG. 7 shows a photograph of the finished product 60 in another embodiment, resting in the anvil 30 with the ultrasonic horn 40 above. FIG. 8 shows a photograph of three finished products 60. FIG. 9 shows a photograph of the finished product 60 according to another embodiment with the anvil 30, the sleeve 20 and the ultrasonic horn 40.

According to a preferred embodiment of this invention, the subject invention does not result in any scrap, rework or edge trim, since the entire moistened charge is converted into the finished product without any product loss.

In another embodiment, the agglomerated product can be subjected to a drying process step to remove any additional moisture.

In one embodiment preferred embodiment of this invention, the process can mold personalized items with indented or embossed logos or names on the product surface. In another embodiment, logos can be added to the product surface by various means including off-set printing, serigraphy, edible stickers, laser and ink jet printing.

While it is understood that the present invention may have multiple embodiments, each one of them resulting in a variety of novelty products, a number of concrete examples of the practice of the invention will be given.

In all the following examples, although not strictly necessary to the performance of the process, the formulae were based only on human-grade ingredients from the five groups of the Food Pyramid, with a prevalence for the vegetables, fruits, milk and meat groups.

From the vegetable group, ingredients were chosen to provide proteins, valuable fibers, carbohydrates, minerals and anti oxidant capability. The recipes included, although not limited to, pre-processed items such as: green peas, yellow peas, pinto beans, sweet potatoes, cabbage, carrots, beets; pomace powders; fresh and dried herbs such as parsley, sage, rosemary, oregano, etc.

From the fruit group ingredients where chosen from, without being limited to, apples, cranberries, blueberries powders and pomaces; chardonnay grape seed flour.

From the milk group, ingredients like, lactose, sodium and calcium caseinate, processed and unprocessed cheeses. The caseinate is a good source of animal proteins; as such, it contains the eight essential amino acids considered to be the daily standard requirements for living.

Although the meat group of the official food pyramid includes dry beans and peas, these ingredients are considered to be as a sub group of the vegetable group. Items from the meat group utilized in the examples' recipes were: freeze dried beef and chicken white meat; seeds like flax seeds, sunflower seeds and nuts like peanuts. Seeds and nuts, which are officially part of the meat group, were added since they are excellent sources of essential fatty acids as well as vitamins.

Various examples of formulas for manufacturing pet food according to this invention will now follow. Please note that these formulas are possible examples and are no way limiting to the possible formulas that may be utilized to manufacture pet food according to this invention.

EXAMPLE 1

A blend of ingredients according to the following pinto beans-carrot pomace, PBCP Formula 2, to which was added a 10% extra moisture, was processed into disc-shaped and bone-shaped products, weighing respectively 7.5 g and 27.5 g.

| | | | | | | | | Total Fiber | Soluble Fiber | Moisture | Energy |
|---|---|---|---|---|---|---|---|---|---|---|---|
| | | Weight (g) | % | Total. Carbs % | Protein % | Sugar % | Fat | % | % | % | (Cal) |
| Pinto Beans Flakes | | 252.00 | 50.40 | 63 | 21 | 0 | 2.4 | 22 | | | 360 |
| Sweet Potato Granules | | — | — | 88.6 | 3.8 | 59.2 | 1.6 | 2.9 | | | 384 |
| Carrot Pomace Powder | | 58.00 | 11.60 | 78.3 | 7.06 | 22.1 | 2.24 | 49.2 | 24 | 6.67 | |
| Apple Pomace Powder | | — | — | 87.9 | 3.8 | 44.7 | 3.7 | 43.2 | 6.2 | 3.5 | 237 |
| Cranberry Pomace Powder | | — | — | 80.3 | 7 | 5 | 8.6 | 75.3 | 4.5 | 6 | 143 |
| Blueberry Pomace Powder | | — | — | 71.4 | 13.8 | 3.90 | 7.7 | 67.5 | 6.5 | 6 | 166 |

PBCP Formula 2

| | PBCP Formula 2 | | | | | | | | |
|---|---|---|---|---|---|---|---|---|---|
| | Weight (g) | % | Total. Carbs % | Protein % | Sugar % | Fat | Total Fiber % | Soluble Fiber % | Moisture % | Energy (Cal) |
| Grape Seed Flour | | — | 66.4 | 17.5 | 18.10 | 6 | 57.2 | | 5.5 | 376.4 |
| Date Powder | | — | | | | | | | | |
| Potato Starch | 38.00 | 7.60 | 100 | 0 | 0 | 0 | 0 | | | 390 |
| Brown Rice Flour | 39.50 | 7.90 | 77.5 | 7.5 | 0 | 2.5 | 2.5 | | | 350 |
| Granulated Rice | | 10.50 | 78 | 7 | 0 | 0 | 0 | | | 370 |
| Bread Crumbs | 9.50 | 1.90 | 53 | 11 | 2 | 0 | 2 | | | 245 |
| Corn Chips Powder | | — | | | | | | | | |
| Parmesan Cheese | | — | | | | | | | | |
| Instant Mashed Potatoes | 21.50 | 4.30 | 71 | 7 | 7 | 9 | 4 | | | 393 |
| Sodium Caseinate | 25.00 | 5.00 | | 90.5 | | 0.8 | | | 5 | |
| Wheat Germ | | — | | | | | | | | |
| Lecithin Powder | 1.00 | 0.20 | | | | | | | | |
| Beef Flavor | 3.00 | 0.60 | | | | | | | | |
| Herbs | | — | | | | | | | | |
| Baking Powder | | — | | | | | | | | |
| Total | 500.00 | 100.00 | 66.81 | 17.77 | 2.90 | 2.09 | 17.20 | 2.78 | 1.02 | 299.13 |

EXAMPLE 2

A blend of ingredients according to the following sweet potato formula 1, SWP Formula 1, to which was added 8% extra moisture, was processed into disc-shaped and bone-shaped products, weighing respectively 7.5 g and 27.5 g.

| | SWP Formula 1 | | | | | | | | |
|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Pinto Beans Flakes | 250.00 | 50.00 | 63.00 | 21.00 | — | 2.40 | 22.00 | | | 360.00 |
| Sweet Potato Granules | 100.00 | 20.00 | 88.60 | 3.80 | 59.20 | 1.60 | 2.90 | | | 384.00 |
| Carrot Pomace Powder | 70.00 | 14.00 | 78.30 | 7.06 | 22.10 | 2.24 | 49.20 | 24.00 | 6.67 | 318.00 |
| Apple Pomace Powder | — | — | 87.90 | 3.80 | 44.70 | 3.70 | 43.20 | 6.20 | 3.50 | 237.00 |
| Cranberry Pomace Powder | — | — | 80.30 | 7.00 | 5.00 | 8.60 | 75.30 | 4.50 | 6.00 | 143.00 |
| Blueberry Pomace Powder | | | 71.40 | 13.80 | 3.90 | 7.70 | 67.50 | 6.50 | 6.00 | 166.00 |
| Grape Seed Flour | | | 66.40 | 17.50 | 18.10 | 6.00 | 57.20 | | 5.50 | 376.40 |
| Date Powder | | | | | | | | | | |
| Potato Starch | — | | 100.00 | — | — | — | — | | | 390.00 |
| Brown Rice | — | | 77.50 | 7.50 | — | 2.50 | 2.50 | | | 350.00 |

SWP Formula 1

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Flour | | | | | | | | | | |
| Granulated Rice | | | 78.00 | 7.00 | — | — | — | | | 370.00 |
| Bread Crumbs | | — | 53.00 | 11.00 | 2.00 | — | 2.00 | | | 245.00 |
| Corn Chips Powder | | — | | | | | | | | |
| Parmesan Cheese | | — | | | | | | | | |
| Instant Mashed Potatoes | 50.00 | 10.00 | 71.00 | 7.00 | 7.00 | 9.00 | 4.00 | | | 393.00 |
| Sodium Caseinate | 25.00 | 5.00 | | 90.50 | | 0.80 | | | 5.00 | 370.00 |
| Wheat Germ | | — | | | | | | | | |
| Lecithin Powder | 1.00 | 0.20 | | | | | | | | |
| Beef Flavor | 3.00 | 0.60 | | | | | | | | |
| Herbs | | — | | | | | | | | |
| Baking Powder | 1.00 | 0.20 | | | | | | | | |
| Total | 500.00 | 100.00 | 67.28 | 17.47 | 15.63 | 2.77 | 18.87 | 3.36 | 1.18 | 359.12 |

EXAMPLE 3

A blend of ingredients according to the following sweet potato formula 2, SWP Formula 2, to which was added 8% extra moisture, was processed into disc-shaped and bone-shaped products, weighing respectively 7.5 g and 27.5 g.

SWP Formula 2

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 225.00 | 45.00 | 63.00 | 21.00 | — | 2.40 | 22.00 | | | 360.00 |
| Sweet Potato Granules | 100.00 | 20.00 | 88.60 | 3.80 | 59.20 | 1.60 | 2.90 | | | 384.00 |
| Carrot Pomace Powder | 50.00 | 10.00 | 78.30 | 7.06 | 22.10 | 2.24 | 49.20 | 24.00 | 6.67 | 318.00 |
| Apple Pomace Powder | 35.00 | 7.00 | 87.90 | 3.80 | 44.70 | 3.70 | 43.20 | 6.20 | 3.50 | 237.00 |
| Cranberry Pomace Powder | 10.00 | 2.00 | 80.30 | 7.00 | 5.00 | 8.60 | 75.30 | 4.50 | 6.00 | 143.00 |
| Blueberry Pomace Powder | | | 71.40 | 13.80 | 3.90 | 7.70 | 67.50 | 6.50 | 6.00 | 166.00 |
| Grape Seed Flour | | | 66.40 | 17.50 | 18.10 | 6.00 | 57.20 | | 5.50 | 376.40 |
| Date Powder | | | | | | | | | | |
| Potato Starch | | — | 100.00 | — | — | — | — | | | 390.00 |
| Brown Rice Flour | | — | 77.50 | 7.50 | — | 2.50 | 2.50 | | | 350.00 |
| Granulated Rice | | | 78.00 | 7.00 | — | — | — | | | 370.00 |
| Bread Crumbs | | | 53.00 | 11.00 | 2.00 | — | 2.00 | | | 245.00 |
| Corn Chips Powder | | — | | | | | | | | |
| Parmesan Cheese | | — | | | | | | | | |
| Instant Mashed Potatoes | 50.00 | 10.00 | 71.00 | 7.00 | 7.00 | 9.00 | 4.00 | | | 393.00 |
| Sodium Caseinate | 25.00 | 5.00 | | 90.50 | | 0.80 | | | 5.00 | 370.00 |
| Wheat Germ | | — | | | | | | | | |
| Lecithin Powder | 1.00 | 0.20 | | | | | | | | |
| Beef Flavor | 1.00 | 0.20 | | | | | | | | |
| Herbs | | — | | | | | | | | |
| Baking Powder | 3.00 | 0.60 | | | | | | | | |
| Total | 500.00 | 100.00 | 68.76 | 16.55 | 17.98 | 3.00 | 20.33 | 2.92 | 1.28 | 347.85 |

EXAMPLE 4

A blend of ingredients according to the following sweet potato formula 4, SWP Formula 4, to which was added 7.5% extra moisture, was processed into disc-shaped and bone-shaped products, weighing respectively 7.5 g and 27.5 g.

SWP Formula 4

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 240.00 | 48.00 | 63.00 | 21.00 | 0.00 | 2.40 | 22.00 | | | 360.00 |
| Sweet Potato Granules | 95.95 | 19.19 | 88.60 | 3.80 | 59.20 | 1.60 | 2.90 | | | 384.00 |
| Carrot Pomace Powder | 79.65 | 15.93 | 78.30 | 7.06 | 22.10 | 2.24 | 49.20 | 24.00 | 6.67 | 318.00 |
| Apple Pomace Powder | — | — | 87.90 | 3.80 | 44.70 | 3.70 | 43.20 | 6.20 | 3.50 | 237.00 |
| Cranberry Pomace Powder | — | — | 80.30 | 7.00 | 5.00 | 8.60 | 75.30 | 4.50 | 6.00 | 143.00 |
| Blueberry Pomace Powder | | | 71.40 | 13.80 | 3.90 | 7.70 | 67.50 | 6.50 | 6.00 | 166.00 |
| Grape Seed Flour | | | 66.40 | 17.50 | 18.10 | 6.00 | 57.20 | | 5.50 | 376.40 |
| Date Powder | | | | | | | | | | |
| Potato Starch | — | | 100.00 | 0.00 | 0.00 | 0.00 | 0.00 | | | 390.00 |
| Brown Rice Flour | — | | 77.50 | 7.50 | 0.00 | 2.50 | 2.50 | | | 350.00 |
| Granulated Rice | | | 78.00 | 7.00 | 0.00 | 0.00 | 0.00 | | | 370.00 |
| Bread Crumbs | — | | 53.00 | 11.00 | 2.00 | 0.00 | 2.00 | | | 245.00 |
| Corn Chips Powder | — | | | | | | | | | |
| Parmesan Cheese | — | | | | | | | | | |
| Instant Mashed Potatoes | 54.70 | 10.94 | 71.00 | 7.00 | 7.00 | 9.00 | 4.00 | | | 393.00 |
| Sodium Caseinate | 24.00 | 4.80 | | 90.50 | | 0.80 | | | 5.00 | 370.00 |
| Wheat Germ | — | | | | | | | | | |
| Lecithin Powder | 1.90 | 0.38 | | | | | | | | |
| Beef Flavor | 1.90 | 0.38 | | | | | | | | |
| Herbs | — | | | | | | | | | |
| Baking Powder | 1.90 | 0.38 | | | | | | | | |
| Total | 500.00 | 100.00 | 67.48 | 17.04 | 15.65 | 2.84 | 19.39 | 3.82 | 1.30 | 357.90 |

EXAMPLE 5

A blend of ingredients according to the following sweet potato formula 5, SWP Formula 5, to which was added 8.5% extra moisture, was processed into disc-shaped and bone-shaped products, weighing respectively 7.5 g and 27.5 g.

| | | | | | | | | | | |
|---|---|---|---|---|---|---|---|---|---|---|
| | | | | | SWP Formula 5 | | | | | |
| | Weight (g) | % | Total. Carbs % | Protein % | Sugar % | Fat | Total Fiber % | Soluble Fiber % | Moisture % | Energy (Cal/100 g) |
| Pinto Beans Flakes | 249.50 | 49.90 | 63.00 | 21.00 | 0.00 | 2.40 | 22.00 | | | 360.00 |
| Sweet Potato Granules | 99.80 | 19.96 | 88.60 | 3.80 | 59.20 | 1.60 | 2.90 | | | 384.00 |
| Carrot Pomace Powder | 59.90 | 11.98 | 78.30 | 7.06 | 22.10 | 2.24 | 49.20 | 24.00 | 6.67 | 318.00 |
| Apple Pomace Powder | 34.90 | 6.98 | 87.90 | 3.80 | 44.70 | 3.70 | 43.20 | 6.20 | 3.50 | 237.00 |
| Cranberry Pomace Powder | 11.00 | 2.20 | 80.30 | 7.00 | 5.00 | 8.60 | 75.30 | 4.50 | 6.00 | 143.00 |
| Blueberry Pomace Powder | | | 71.40 | 13.80 | 3.90 | 7.70 | 67.50 | 6.50 | 6.00 | 166.00 |
| Grape Seed Flour | | | 66.40 | 17.50 | 18.10 | 6.00 | 57.20 | | 5.50 | 376.40 |
| Date Powder | | | | | | | | | | |
| Potato Starch | — | | 100.00 | 0.00 | 0.00 | 0.00 | 0.00 | | | 390.00 |
| Brown Rice Flour | — | | 77.50 | 7.50 | 0.00 | 2.50 | 2.50 | | | 350.00 |
| Granulated Rice | | | 78.00 | 7.00 | 0.00 | 0.00 | 0.00 | | | 370.00 |
| Bread Crumbs | — | | 53.00 | 11.00 | 2.00 | 0.00 | 2.00 | | | 245.00 |
| Corn Chips Powder | — | | | | | | | | | |
| Parmesan Cheese | — | | | | | | | | | |
| Instant Mashed Potatoes | — | — | 71.00 | 7.00 | 7.00 | 9.00 | 4.00 | | | 393.00 |
| Sodium Caseinate | 39.90 | 7.98 | | 90.50 | | 0.80 | | | 5.00 | 370.00 |
| Wheat Germ | — | | | | | | | | | |
| Lecithin Powder | 3.00 | 0.60 | | | | | | | | |
| Beef Flavor | 2.00 | 0.40 | | | | | | | | |
| Herbs | — | | | | | | | | | |
| Baking Powder | — | — | | | | | | | | |
| Total | 500.00 | 100.00 | 66.40 | 19.72 | 17.69 | 2.30 | 22.12 | 3.41 | 1.57 | 343.60 |

EXAMPLE 6

A blend of ingredients according to the following sweet potato formula 5A, SWP Formula 5A, to which was added 9.5% extra moisture, was processed into disc-shaped and bone-shaped products, weighing respectively 7.5 g and 27.5 g.

| | SWP Formula 5A | | | | | | | | | |
|---|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Pinto Beans Flakes | 225.00 | 45.00 | 63.00 | 21.00 | 0.00 | 2.40 | 22.00 | | | 360.00 |
| Sweet Potato Granules | 100.00 | 20.00 | 88.60 | 3.80 | 59.20 | 1.60 | 2.90 | | | 384.00 |
| Carrot Pomace Powder | 85.00 | 17.00 | 78.30 | 7.06 | 22.10 | 2.24 | 49.20 | 24.00 | 6.67 | 318.00 |
| Apple Pomace Powder | 35.00 | 7.00 | 87.90 | 3.80 | 44.70 | 3.70 | 43.20 | 6.20 | 3.50 | 237.00 |
| Cranberry Pomace Powder | 11.00 | 2.20 | 80.30 | 7.00 | 5.00 | 8.60 | 75.30 | 4.50 | 6.00 | 143.00 |
| Blueberry Pomace Powder | | | 71.40 | 13.80 | 3.90 | 7.70 | 67.50 | 6.50 | 6.00 | 166.00 |
| Grape Seed Flour | | | 66.40 | 17.50 | 18.10 | 6.00 | 57.20 | | 5.50 | 376.40 |
| Date Powder | | | | | | | | | | |
| Potato Starch | — | | 100.00 | 0.00 | 0.00 | 0.00 | 0.00 | | | 390.00 |
| Brown Rice Flour | | | 77.50 | 7.50 | 0.00 | 2.50 | 2.50 | | | 350.00 |
| Granulated Rice | | | 78.00 | 7.00 | 0.00 | 0.00 | 0.00 | | | 370.00 |
| Bread Crumbs | — | | 53.00 | 11.00 | 2.00 | 0.00 | 2.00 | | | 245.00 |
| Corn Chips Powder | | | | | | | | | | |
| Parmesan Cheese | | | | | | | | | | |
| Instant Mashed Potatoes | — | — | 71.00 | 7.00 | 7.00 | 9.00 | 4.00 | | | 393.00 |
| Sodium Caseinate | 40.00 | 8.00 | | 90.50 | | 0.80 | | | 5.00 | 370.00 |
| Wheat Germ | — | | | | | | | | | |
| Lecithin Powder | 3.00 | 0.60 | | | | | | | | |
| Beef Flavor | 1.00 | 0.20 | | | | | | | | |
| Herbs | — | | | | | | | | | |
| Baking Powder | — | — | | | | | | | | |
| Total | 500.00 | 100.00 | 67.30 | 19.07 | 18.84 | 2.29 | 23.52 | 4.61 | 1.91 | 342.20 |

EXAMPLE 7

A blend of ingredients according to the following sweet potato formula 6, SWP Formula 6, to which was added 9.5% extra moisture, was processed into disc, dome and bone-shaped products, weighing respectively 7.5 g, 11 g, and 27.5 g.

| | SWP Formula 6 | | | | | | | | | |
|---|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Pinto Beans Flakes | 175.00 | 35.00 | 63.00 | 21.00 | 0.00 | 2.40 | 22.00 | | | 360.00 |
| Sweet Potato Granules | 125.00 | 25.00 | 88.60 | 3.80 | 59.20 | 1.60 | 2.90 | | | 384.00 |
| Carrot Pomace Powder | 20.00 | 4.00 | 78.30 | 7.06 | 22.10 | 2.24 | 49.20 | 24.00 | 6.67 | 318.00 |

-continued

SWP Formula 6

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Apple Pomace Powder | 45.00 | 9.00 | 87.90 | 3.80 | 44.70 | 3.70 | 43.20 | 6.20 | 3.50 | 237.00 |
| Cranberry Pomace Powder | 10.00 | 2.00 | 80.30 | 7.00 | 5.00 | 8.60 | 75.30 | 4.50 | 6.00 | 143.00 |
| Blueberry Pomace Powder | 10.00 | 2.00 | 71.40 | 13.80 | 3.90 | 7.70 | 67.50 | 6.50 | 6.00 | 166.00 |
| Grape Seed Flour | 10.00 | 2.00 | 66.40 | 17.50 | 18.10 | 6.00 | 57.20 | | 5.50 | 376.40 |
| Date Powder | 75 | 15.00 | | | | | | | | |
| Potato Starch | — | | 100.00 | 0.00 | 0.00 | 0.00 | 0.00 | | | 390.00 |
| Brown Rice Flour | — | | 77.50 | 7.50 | 0.00 | 2.50 | 2.50 | | | 350.00 |
| Granulated Rice | | | 78.00 | 7.00 | 0.00 | 0.00 | 0.00 | | | 370.00 |
| Bread Crumbs | — | | 53.00 | 11.00 | 2.00 | 0.00 | 2.00 | | | 245.00 |
| Corn Chips Powder | — | | | | | | | | | |
| Parmesan Cheese | — | | | | | | | | | |
| Instant Mashed Potatoes | — | — | 71.00 | 7.00 | 7.00 | 9.00 | 4.00 | | | 393.00 |
| Sodium Caseinate | 25.00 | 5.00 | | 90.50 | | 0.80 | | | 5.00 | 370.00 |
| Wheat Germ | — | | | | | | | | | |
| Lecithin Powder | 5.00 | 1.00 | | | | | | | | |
| Beef Flavor | — | — | | | | | | | | |
| Herbs | | | | | | | | | | |
| Baking Powder | — | — | | | | | | | | |
| Total | 500.00 | 100.00 | 59.61 | 14.22 | 20.25 | 2.15 | 18.28 | 1.74 | 1.18 | 288.26 |

EXAMPLE 8

A blend of ingredients according to the following sweet potato formula 7, SWP Formula 7, to which was added 5% extra moisture, was processed into disc-shaped and bone-shaped products, weighing respectively 7.5 g and 27.5 g.

SWP Formula 7

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 225.00 | 40.91 | 63.00 | 21.00 | 0.00 | 2.40 | 22.00 | | | 360.00 |
| Sweet Potato Granules | 100.00 | 18.18 | 88.60 | 3.80 | 59.20 | 1.60 | 2.90 | | | 384.00 |
| Carrot Pomace Powder | 20.00 | 3.64 | 78.30 | 7.06 | 22.10 | 2.24 | 49.20 | 24.00 | 6.67 | 318.00 |
| Apple Pomace Powder | 45.00 | 8.18 | 87.90 | 3.80 | 44.70 | 3.70 | 43.20 | 6.20 | 3.50 | 237.00 |
| Cranberry Pomace Powder | 10.00 | 1.82 | 80.30 | 7.00 | 5.00 | 8.60 | 75.30 | 4.50 | 6.00 | 143.00 |
| Blueberry Pomace Powder | 10.00 | 1.82 | 71.40 | 13.80 | 3.90 | 7.70 | 67.50 | 6.50 | 6.00 | 166.00 |
| Grape Seed Flour | 10.00 | 1.82 | 66.40 | 17.50 | 18.10 | 6.00 | 57.20 | | 5.50 | 376.40 |
| Date Powder | 35.00 | 6.36 | | | | | | | | |
| V7 Vegetable | 50.00 | 9.09 | | | | | | | | |

-continued

| SWP Formula 7 | | | | | | | | | |
|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Powder | | | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated Rice | | — | 78.00 | 7.00 | 0.00 | 0.00 | 0.00 | | | 370.00 |
| Bread Crumbs | | — | 53.00 | 11.00 | 2.00 | 0.00 | 2.00 | | | 245.00 |
| Corn Chips Powder | | — | | | | | | | | |
| Parmesan Cheese | | — | | | | | | | | |
| Instant Mashed Potatoes | | — | 71.00 | 7.00 | 7.00 | 9.00 | 4.00 | | | 393.00 |
| Sodium Caseinate | 25.00 | 4.55 | | 90.50 | | 0.80 | | | 5.00 | 370.00 |
| Wheat Germ | | — | | | | | | | | |
| Lecithin Powder | 10.00 | 1.82 | | | | | | | | |
| Beef Flavor | 10.00 | 1.82 | | | | | | | | |
| Herbs | | — | | | | | | | | |
| Baking Powder | | — | | | | | | | | |
| Total | 550.00 | 100.00 | 55.89 | 14.66 | 15.72 | 2.10 | 18.49 | 1.58 | 1.07 | 277.33 |

EXAMPLE 9

A blend of ingredients according to the following sweet potato formula 8, SWP Formula 8 PR, to which was added 10% extra moisture, was processed into bone-shaped products, of two sizes, weighing respectively 25 g and 35 g.

| SWP Formula 8 PR | | | | | | | | | |
|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Pinto Beans Flakes | 500.00 | 38.83 | 63.00 | 21.00 | 0.00 | 2.40 | 22.00 | | | 360.00 |
| Sweet Potato Granules | 312.50 | 24.27 | 88.60 | 3.80 | 59.20 | 1.60 | 2.90 | | | 384.00 |
| Carrot Pomace Powder | 125.00 | 9.71 | 78.30 | 7.06 | 22.10 | 2.24 | 49.20 | 24.00 | 6.67 | 318.00 |
| Apple Pomace Powder | | — | 87.90 | 3.80 | 44.70 | 3.70 | 43.20 | 6.20 | 3.50 | 237.00 |
| Cranberry Pomace Powder | | — | 80.30 | 7.00 | 5.00 | 8.60 | 75.30 | 4.50 | 6.00 | 143.00 |
| Blueberry Pomace Powder | | — | 71.40 | 13.80 | 3.90 | 7.70 | 67.50 | 6.50 | 6.00 | 166.00 |
| Grape Seed Flour | | — | 66.40 | 17.50 | 18.10 | 6.00 | 57.20 | | 5.50 | 376.40 |
| Date Powder | | — | | | | | | | | |
| V7 Vegetable Powder | | — | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated | | — | 78.00 | 7.00 | 0.00 | 0.00 | | | | 370.00 |

SWP Formula 8 PR

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Rice Bread Crumbs | | — | 53.00 | 11.00 | 2.00 | 0.00 | 2.00 | | | 245.00 |
| Corn Chips Powder | | — | | | | | | | | |
| Parmesan Cheese | 250.00 | 19.42 | | | | | | | | |
| Instant Mashed Potatoes | | — | 71.00 | 7.00 | 7.00 | 9.00 | 4.00 | | | 393.00 |
| Sodium Caseinate | 62.50 | 4.85 | | 90.50 | | 0.80 | | | 5.00 | 370.00 |
| Wheat Germ | | — | | | | | | | | |
| Lecithin Powder | 12.50 | 0.97 | | | | | | | | |
| Beef Flavor | | — | | | | | | | | |
| Herbs | 25.00 | 1.94 | | | | | | | | |
| Baking Powder | | — | | | | | | | | |
| Total | 1,287.50 | 100.00 | 53.57 | 14.16 | 16.51 | 1.58 | 14.02 | 2.33 | 0.89 | 281.84 |

EXAMPLE 10

A blend of ingredients according to the following pinto bean sweet potato frozen dried meat-chicken Formula 9, PB,SWP,FDM-C Formula 9, to which was added 7.5% extra moisture, was processed into bone-shaped products weighing respectively 27.5 g.

PB, SWP, FDM-C Formula 9

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 300.00 | 39.14 | 63.00 | 21.00 | 0.00 | 2.40 | 22.00 | | | 360.00 |
| Sweet Potato Granules | 150.00 | 19.57 | 88.60 | 3.80 | 59.20 | 1.60 | 2.90 | | | 384.00 |
| Carrot Pomace Powder | 50.00 | 6.52 | 78.30 | 7.06 | 22.10 | 2.24 | 49.20 | 24.00 | 6.67 | 318.00 |
| Apple Pomace Powder | 30.00 | 3.91 | 87.90 | 3.80 | 44.70 | 3.70 | 43.20 | 6.20 | 3.50 | 237.00 |
| Cranberry Pomace Powder | | — | 80.30 | 7.00 | 5.00 | 8.60 | 75.30 | 4.50 | 6.00 | 143.00 |
| Blueberry Pomace Powder | | — | 71.40 | 13.80 | 3.90 | 7.70 | 67.50 | 6.50 | 6.00 | 166.00 |
| Grape Seed Flour | 20.00 | 2.61 | 66.40 | 17.50 | 18.10 | 6.00 | 57.20 | | 5.50 | 376.40 |
| Date Powder | | — | | | | | | | | |
| V7 Vegetable Powder | | — | | | | | | | | |
| Sunflower seeds | | — | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated Rice | | — | 78.00 | 7.00 | 0.00 | 0.00 | 0.00 | | | 370.00 |
| Bread Crumbs | | — | 53.00 | 11.00 | 2.00 | 0.00 | 2.00 | | | 245.00 |
| Corn Chips | | — | | | | | | | | |

PB, SWP, FDM-C Formula 9

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Powder | | | | | | | | | | |
| Parmesan Cheese | 70.00 | 9.13 | | 33.00 | 0.00 | 28.40 | 0.00 | 0.00 | 30.80 | 392.00 |
| Freeze Dried Meat-Beef | | | | | | | | | | |
| Freeze Dried Meat-Chicken | 81.00 | 10.57 | 0.00 | 94.85 | 1.00 | 2.73 | 0.80 | 0.80 | 4.00 | 404.00 |
| Instant Mashed Potatoes | | | 71.00 | 7.00 | 7.00 | 9.00 | 4.00 | | | 393.00 |
| Sodium Caseinate | 50.00 | 6.52 | | 90.50 | | 0.80 | | | 5.00 | 370.00 |
| Wheat Germ | | — | | | | | | | | |
| Lecithin Powder | 8.00 | 1.04 | | | | | | | | |
| Beef Flavor | | — | | | | | | | | |
| Herbs | 7.50 | 0.98 | | | | | | | | |
| Baking Powder | | — | | | | | | | | |
| Total | 766.50 | 100.00 | 52.28 | 28.97 | 15.35 | 4.63 | 15.66 | 1.89 | 4.28 | 358.52 |

EXAMPLE 11

A blend of ingredients according to the following pinto bean sweet potato frozen dried meat-beef Formula 11, PB,SWP,FDM-B Formula 11, to which was added 10% extra moisture, was processed into bone-shaped products weighing respectively 27.5 g.

PB, SWP, FDM-B Formula 11

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 300.00 | 39.14 | 63.00 | 21.00 | 0.00 | 2.40 | 22.00 | | | 360.00 |
| Sweet Potato Granules | 150.00 | 19.57 | 88.60 | 3.80 | 59.20 | 1.60 | 2.90 | | | 384.00 |
| Carrot Pomace Powder | 50.00 | 6.52 | 78.30 | 7.06 | 22.10 | 2.24 | 49.20 | 24.00 | 6.67 | 318.00 |
| Apple Pomace Powder | 30.00 | 3.91 | 87.90 | 3.80 | 44.70 | 3.70 | 43.20 | 6.20 | 3.50 | 237.00 |
| Cranberry Pomace Powder | | — | 80.30 | 7.00 | 5.00 | 8.60 | 75.30 | 4.50 | 6.00 | 143.00 |
| Blueberry Pomace Powder | | — | 71.40 | 13.80 | 3.90 | 7.70 | 67.50 | 6.50 | 6.00 | 166.00 |
| Grape Seed Flour | 20.00 | 2.61 | 66.40 | 17.50 | 18.10 | 6.00 | 57.20 | | 5.50 | 376.40 |
| Date Powder | | — | | | | | | | | |
| V7 Vegetable Powder | | — | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated Rice | | — | 78.00 | 7.00 | 0.00 | 0.00 | 0.00 | | | 370.00 |
| Bread Crumbs | | — | 53.00 | 11.00 | 2.00 | 0.00 | 2.00 | | | 245.00 |
| Corn Chips Powder | | — | | | | | | | | |
| Parmesan Cheese | 70.00 | 9.13 | | 33.00 | 0.00 | 28.40 | 0.00 | 0.00 | 30.80 | 392.00 |

-continued

PB, SWP, FDM-B Formula 11

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Freeze Dried Meat-Beef | 81.00 | 10.57 | | | | | | | | |
| Freeze Dried Meat-Chicken | | — | 0.00 | 94.85 | 1.00 | 2.73 | 0.80 | 0.80 | 4.00 | 404.00 |
| Instant Mashed Potatoes | | — | 71.00 | 7.00 | 7.00 | 9.00 | 4.00 | | | 393.00 |
| Sodium Caseinate | 50.00 | 6.52 | | 90.50 | | 0.80 | | | 5.00 | 370.00 |
| Wheat Germ | | — | | | | | | | | |
| Lecithin Powder | 8.00 | 1.04 | | | | | | | | |
| Beef Flavor | | — | | | | | | | | |
| Herbs | 7.50 | 0.98 | | | | | | | | |
| Baking Powder | | — | | | | | | | | |
| Total | 766.50 | 100.00 | 52.28 | 18.95 | 15.25 | 4.35 | 15.57 | 1.81 | 3.85 | 315.82 |

EXAMPLE 12

A blend of ingredients according to the following pinto bean sweet potato frozen dried meat-beef Formula 12, PB,SWP,FDM-B Formula 12, to which was added 10% extra moisture, was processed into bone-shaped products weighing respectively 27.5 g.

PB, SWP, FDM-B Formula 12

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 300.00 | 33.65 | 63.00 | 21.00 | 0.00 | 2.40 | 22.00 | | | 360.00 |
| Sweet Potato Granules | 150.00 | 16.83 | 88.60 | 3.80 | 59.20 | 1.60 | 2.90 | | | 384.00 |
| Carrot Pomace Powder | 50.00 | 5.61 | 78.30 | 7.06 | 22.10 | 2.24 | 49.20 | 24.00 | 6.67 | 318.00 |
| Apple Pomace Powder | 30.00 | 3.37 | 87.90 | 3.80 | 44.70 | 3.70 | 43.20 | 6.20 | 3.50 | 237.00 |
| Cranberry Pomace Powder | | — | 80.30 | 7.00 | 5.00 | 8.60 | 75.30 | 4.50 | 6.00 | 143.00 |
| Blueberry Pomace Powder | | — | 71.40 | 13.80 | 3.90 | 7.70 | 67.50 | 6.50 | 6.00 | 166.00 |
| Grape Seed Flour | 20.00 | 2.24 | 66.40 | 17.50 | 18.10 | 6.00 | 57.20 | | 5.50 | 376.40 |
| Date Powder | | — | | | | | | | | |
| V7 Vegetable Powder | | — | | | | | | | | |
| Sunflower Seeds | 125.00 | 14.02 | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated Rice | | — | 78.00 | 7.00 | 0.00 | 0.00 | 0.00 | | | 370.00 |
| Bread Crumbs | | — | 53.00 | 11.00 | 2.00 | 0.00 | 2.00 | | | 245.00 |
| Corn Chips Powder | | — | | | | | | | | |
| Parmesan Cheese | 70.00 | 7.85 | | 33.00 | 0.00 | 28.40 | 0.00 | 0.00 | 30.80 | 392.00 |
| Freeze Dried | 81.00 | 9.09 | | | | | | | | |

PB, SWP, FDM-B Formula 12

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Meat-Beef Freeze Dried | | — | 0.00 | 94.85 | 1.00 | 2.73 | 0.80 | 0.80 | 4.00 | 404.00 |
| Meat-Chicken Instant Mashed Potatoes | | — | 71.00 | 7.00 | 7.00 | 9.00 | 4.00 | | | 393.00 |
| Sodium Caseinate | 50.00 | 5.61 | | 90.50 | | 0.80 | | | 5.00 | 370.00 |
| Wheat Germ Lecithin Powder | 8.00 | 0.90 | | | | | | | | |
| Beef Flavor Herbs | 7.50 | 0.84 | | | | | | | | |
| Baking Powder | | — | | | | | | | | |
| Total | 891.50 | 100.00 | 44.95 | 16.29 | 13.11 | 3.74 | 13.39 | 1.55 | 3.31 | 271.54 |

EXAMPLE 13

A blend of ingredients according to the following pinto bean sweet potato frozen dried meat-beef Formula 12, PB,SWP,FDM-C Formula 12 A, to which was added 10% extra moisture, was processed into bone-shaped products weighing respectively 27.5 g.

PB, SWP, FDM-C Formula 12A

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Pinto Beans Flakes | 300.00 | 32.59 | 63.00 | 21.00 | 0.00 | 2.40 | 22.00 | | | 360.00 |
| Sweet Potato Granules | 150.00 | 16.30 | 88.60 | 3.80 | 59.20 | 1.60 | 2.90 | | | 384.00 |
| Carrot Pomace Powder | 50.00 | 5.43 | 78.30 | 7.06 | 22.10 | 2.24 | 49.20 | 24.00 | 6.67 | 318.00 |
| Apple Pomace Powder | 30.00 | 3.26 | 87.90 | 3.80 | 44.70 | 3.70 | 43.20 | 6.20 | 3.50 | 237.00 |
| Cranberry Pomace Powder | | — | 80.30 | 7.00 | 5.00 | 8.60 | 75.30 | 4.50 | 6.00 | 143.00 |
| Blueberry Pomace Powder | | — | 71.40 | 13.80 | 3.90 | 7.70 | 67.50 | 6.50 | 6.00 | 166.00 |
| Grape Seed Flour | 20.00 | 2.17 | 66.40 | 17.50 | 18.10 | 6.00 | 57.20 | | 5.50 | 376.40 |
| Date Powder | | — | | | | | | | | |
| V7 Vegetable Powder | | — | | | | | | | | |
| Sunflower seeds | 100.00 | 10.86 | | | | | | | | |
| Potato Starch | | — | 100.00 | 0.00 | 0.00 | 0.00 | 0.00 | | | 390.00 |
| Brown Rice Flour | | — | 77.50 | 7.50 | 0.00 | 2.50 | 2.50 | | | 350.00 |
| Granulated Rice | | — | 78.00 | 7.00 | 0.00 | 0.00 | 0.00 | | | 370.00 |
| Bread Crumbs | | — | 53.00 | 11.00 | 2.00 | 0.00 | 2.00 | | | 245.00 |
| Corn Chips Powder | | — | | | | | | | | |
| Parmesan Cheese | 70.00 | 7.60 | | 33.00 | 0.00 | 28.40 | 0.00 | 0.00 | 30.80 | 392.00 |
| Freeze Dried Meat-Beef Freeze Dried | 135.00 | 14.67 | 0.00 | 94.85 | 1.00 | 2.73 | 0.80 | 0.80 | 4.00 | 404.00 |

-continued

| PB, SWP, FDM-C Formula 12A | | | | | | | | | | |
|---|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Meat-Chicken Instant Mashed Potatoes | — | — | 71.00 | 7.00 | 7.00 | 9.00 | 4.00 | | | 393.00 |
| Sodium Caseinate | 50.00 | 5.43 | | 90.50 | | 0.80 | | | 5.00 | 370.00 |
| Wheat Germ | — | | | | | | | | | |
| Lecithin Powder | 8.00 | 0.87 | | | | | | | | |
| Beef Flavor | — | | | | | | | | | |
| Herbs | 7.50 | 0.81 | | | | | | | | |
| Baking Powder | — | | | | | | | | | |
| Total | 920.50 | 100.00 | 43.53 | 29.69 | 12.84 | 4.02 | 13.08 | 1.62 | 3.80 | 322.24 |

EXAMPLE 14

The following FDM-C Formula 14, made entirely of freeze-dried chicken meat, was moisturized with 21% extra water and converted into bone-shaped products weighing respectively 19.5 g. To be noted in this case, is the ability of the process to agglomerate the fines deriving from the highly friable ingredient.

| FDM-C Formula 14 | | | | | | | | | | |
|---|---|---|---|---|---|---|---|---|---|---|
| | Weight (g) | % | Total. Carbs % | Protein % | Sugar % | Fat | Total Fiber % | Soluble Fiber % | Moisture % | Energy (Cal/100 g) |
| Pinto Beans Flakes | — | — | 63.00 | 21.00 | 0.00 | 2.40 | 22.00 | | | 360.00 |
| Sweet Potato Granules | — | — | 88.60 | 3.80 | 59.20 | 1.60 | 2.90 | | | 384.00 |
| Carrot Pomace Powder | — | — | 78.30 | 7.06 | 22.10 | 2.24 | 49.20 | 24.00 | 6.67 | 318.00 |
| Apple Pomace Powder | — | — | 87.90 | 3.80 | 44.70 | 3.70 | 43.20 | 6.20 | 3.50 | 237.00 |
| Cranberry Pomace Powder | — | — | 80.30 | 7.00 | 5.00 | 8.60 | 75.30 | 4.50 | 6.00 | 143.00 |
| Blueberry Pomace Powder | — | — | 71.40 | 13.80 | 3.90 | 7.70 | 67.50 | 6.50 | 6.00 | 166.00 |
| Grape Seed Flour | — | — | 66.40 | 17.50 | 18.10 | 6.00 | 57.20 | | 5.50 | 376.40 |
| Date Powder | — | — | | | | | | | | |
| V7 Vegetable Powder | — | — | | | | | | | | |
| Sunflower seeds | — | — | 24.20 | | | 51.50 | | | | |
| Potato Starch | — | — | 100.00 | 0.00 | 0.00 | 0.00 | 0.00 | | | 390.00 |
| Brown Rice Flour | — | — | 77.50 | 7.50 | 0.00 | 2.50 | 2.50 | | | 350.00 |
| Granulated Rice | — | — | 78.00 | 7.00 | 0.00 | 0.00 | 0.00 | | | 370.00 |
| Bread Crumbs | — | — | 53.00 | 11.00 | 2.00 | 0.00 | 2.00 | | | 245.00 |
| Corn Chips Powder | — | — | | | | | | | | |
| Parmesan Cheese | — | — | | 33.00 | 0.00 | 28.40 | 0.00 | 0.00 | 30.80 | 392.00 |
| Freeze Dried Meat-Beef | — | — | | | | | | | | |
| Freeze Dried Meat-Chicken | 200.00 | 100.00 | 0.00 | 94.85 | 1.00 | 2.73 | 0.80 | 0.80 | 4.00 | 404.00 |
| Instant Mashed Potatoes | — | — | 71.00 | 7.00 | 7.00 | 9.00 | 4.00 | | | 393.00 |
| Sodium Caseinate | — | — | | 90.50 | | 0.80 | | | 5.00 | 370.00 |
| Wheat Germ | — | — | | | | | | | | |
| Lecithin Powder | — | — | | | | | | | | |
| Beef Flavor | — | — | | | | | | | | |

-continued

FDM-C Formula 14

| | Weight (g) | % | Total. Carbs % | Protein % | Sugar % | Fat | Total Fiber % | Soluble Fiber % | Moisture % | Energy (Cal/100 g) |
|---|---|---|---|---|---|---|---|---|---|---|
| Herbs | — | — | | | | | | | | |
| Baking Powder | — | — | | | | | | | | |
| Total | 200.00 | 100.00 | 0.00 | 94.85 | 1.00 | 2.73 | 0.80 | 0.80 | 4.00 | 404.00 |

Thus, the invention provides a method for manufacturing pet food. Specifically, this invention provides a method of manufacturing pet food with an ultrasonic horn and an anvil and without the use of undesirable components such as plasticizers, dyes, chemicals or artificial preservatives.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for producing pet food comprising:
   supplying a combination of ingredients selected from the food groups consisting of vegetable group, fruit group, milk group and meat group comprising a variety of particulate forms and sizes;
   mixing the ingredients with water to coat the surface of the various ingredients to a desired moisture level of 2 to 15% by weight and to a homogeneous blend;
   depositing a metered amount of a charge of the homogenous blend into a sleeve including a forming chamber;
   compressing the charge of ingredients between an anvil plug and an ultrasonic horn by means of an actuator; and
   energizing the ultrasonic horn to cause the charge to be agglomerated into a desired shape of product with a desired texture and a different density from the homogenous blend.

2. The method for producing pet food of claim 1, wherein the step of compressing the charge of ingredients is to a pressure rate of 10 to 50 kg/cm².

3. The method for producin g pet food of claim 1, further comprising the step of drying the product after agglomeration.

4. The method for producing pet food of claim 1, wherein the anvil plug includes a forming surface comprising one of flat, convex and concave.

5. The method of claim 4 wherein the anvil plug comprises an acoustic tool to inject energy into the charge.

6. The method for producing pet food of claim 1, wherein the ultrasonic horn is energized for a dwell time of 100 milliseconds to 3 seconds, at a frequency of 15 kHz to 40 kHz and at an amplitude of 15 to 75 micrometers.

7. The method for producing pet food of claim 1, wherein the ultrasonic horn includes a forming surface comprising one of flat, convex and concave.

8. The method for producing pet food of claim 1, further comprising the step of applying surface details to the pet food product.

9. A method for producing pet food comprising:
   supplying a combination of wet and dry ingredients consisting of those from the vegetables, fruits, milk and meat groups comprising a variety of particulate forms and sizes;
   mixing the ingredients to a homogeneous blend to a moisture level of 2 to 15% by weight;
   depositing a metered amount of a charge of the homogenous blend into a sleeve including a forming chamber;
   compressing the charge of ingredients between an anvil plug and an ultrasonic horn by means of an actuator; and
   energizing the ultrasonic horn to cause the charge to be agglomerated into a desired shape having a different texture and hardness from the homogenous blend.

10. A method for producing pet food comprising:
    supplying a combination of ingredients consisting of those from the vegetables and fruits groups, the combination of ingredients comprising a variety of particulate forms and sizes;
    mixing the ingredients with water to coat the surface of the various ingredients to a desired moisture level of 2 to 15% by weight and to a homogeneous blend having a first hardness and texture;
    depositing a metered amount of a charge of the homogeneous blend into a sleeve including a forming chamber;
    compressing the charge of ingredients between an anvil plug and an ultrasonic horn by means of an actuator; and
    energizing the ultrasonic horn to cause the charge to be agglomerated into a desired shape having a second hardness and texture different from the first hardness and texture.

11. The method for producing pet food of claim 10, wherein the step of compressing the charge of ingredients is to a pressure rate of 10 to 50 kg/cm².

12. The method for producing pet food of claim 10, further comprising the step of drying the product after agglomeration.

13. The method for producing pet food of claim 10, wherein the anvil plug includes a forming surface comprising one of flat, convex and concave.

14. The method for producing pet food of claim 10, wherein the ultrasonic horn is energized for a dwell time of 100 milliseconds to 3 seconds, at a frequency of 15 kHz to 40 kHz and at an amplitude of 15 to 75 micrometers.

15. The method for producing pet food of claim 10, wherein the ultrasonic horn includes a forming surface comprising one of flat, convex and concave.

16. The method for producing pet food of claim 10, further comprising the step of applying surface details to the pet food product.

17. A method for producing pet food comprising:
- supplying dried ingredients consisting of the meat group comprising a variety of particulate forms and sizes;
- mixing the dried ingredients with water to coat the surface of the ingredients to a desired moisture level of 2 to 7% by weight and to a homogeneous blend;
- depositing a metered amount of a charge of the homogeneous blend into a sleeve including a forming chamber;
- compressing the charge between an anvil plug and an ultrasonic horn by means of an actuator; and
- energizing the ultrasonic horn to cause the charge to be agglomerated into a desired shape having a different texture and a different density from the homogenous blend.

18. The method for producing pet food of claim 17, wherein the step of compressing the charge of dried ingredients from the meat group is to a pressure rate of 10 to 50 $kg/cm^2$.

19. The method for producing pet food of claim 17, further comprising the step of drying the product after agglomeration.

20. The method for producing pet food of claim 17, wherein the ultrasonic horn is energized for a dwell time of 100 milliseconds to 3 seconds, at a frequency of 15 kHz to 40 kHz and at an amplitude of 15 to 75 micrometers.

* * * * *